(12) United States Patent
Eronen et al.

(10) Patent No.: US 7,984,291 B2
(45) Date of Patent: Jul. 19, 2011

(54) METHOD FOR DISTRIBUTING CERTIFICATES IN A COMMUNICATION SYSTEM

(75) Inventors: Pasi Eronen, Helsinki (FI); Nadarajah Asokan, Espoo (FI); Shreekanth Lakshmeshwar, Espoo (FI)

(73) Assignee: Spyder Navigations, L.L.C., Wilmington, DE (US)

( * ) Notice: Subject to any disclaimer, the term of this patent is extended or adjusted under 35 U.S.C. 154(b) by 984 days.

(21) Appl. No.: 11/350,087

(22) Filed: Feb. 9, 2006

(65) Prior Publication Data
US 2006/0253703 A1    Nov. 9, 2006

(30) Foreign Application Priority Data
May 9, 2005 (FI) .................................... 20050491

(51) Int. Cl.
*H04L 29/06* (2006.01)
*H04W 4/00* (2009.01)
*H04W 36/00* (2009.01)

(52) U.S. Cl. ...................... 713/156; 455/432.1; 455/436

(58) Field of Classification Search .................. 455/433; 713/155–156, 168–171; 380/247–249, 277–279; 726/3–15, 21
See application file for complete search history.

(56) References Cited

U.S. PATENT DOCUMENTS

| 6,246,771 | B1 * | 6/2001 | Stanton et al. ................. 380/286 |
| 6,725,039 | B1 * | 4/2004 | Parmar et al. ................. 455/436 |
| 6,976,177 | B2 * | 12/2005 | Ahonen ............................ 726/3 |
| 7,640,428 | B2 * | 12/2009 | Adams et al. ................. 713/156 |
| 2003/0028763 | A1 * | 2/2003 | Malinen et al. ............... 713/155 |
| 2003/0092425 | A1 * | 5/2003 | Okazaki et al. ............... 455/411 |
| 2003/0119481 | A1 | 6/2003 | Haverinen et al. |
| 2004/0073785 | A1 | 4/2004 | Hurtta et al. |
| 2004/0093493 | A1 * | 5/2004 | Bisbee et al. ................. 713/156 |
| 2004/0253943 | A1 * | 12/2004 | Suzuki et al. ................. 455/411 |
| 2005/0069137 | A1 * | 3/2005 | Landrock ....................... 380/278 |
| 2005/0071677 | A1 * | 3/2005 | Khanna et al. ............... 713/201 |
| 2005/0154909 | A1 * | 7/2005 | Zhang et al. ................. 713/200 |
| 2006/0059332 | A1 * | 3/2006 | Adams et al. ................. 713/156 |

FOREIGN PATENT DOCUMENTS

| JP | 2003-218954 | 7/2003 |
| JP | 2004-527017 | 9/2004 |
| WO | WO 00/38440 | 6/2000 |
| WO | WO-02/21464 | 3/2002 |
| WO | WO 2004/028071 | 4/2004 |
| WO | WO-2005/036852 | 4/2005 |
| WO | WO 2005/107166 | 11/2005 |

OTHER PUBLICATIONS

International Search Report and Written Opinion for PCT/FI2006/000150 mailed on Oct. 31, 2006.
Communication from European Patent Office for European Patent Application 06743518.0, mailed May 10, 2010.
First Office Action for Chinese Application 200680012663.9, notification date Apr. 29, 2010.

(Continued)

*Primary Examiner* — Emmanuel L Moise
*Assistant Examiner* — Phy Anh Vu

(57) ABSTRACT

The invention relates to a method for delivering certificates in a communication system using Extensible Authentication Protocol (EAP). The identity of a mobile node is sent to a gateway from which the identity is sent to a network entity. In the network entity is selected at least one first certificate based on information relating to the mobile node. In the network entity is signed the at least one first certificate using a master key. The at least one first certificate is provided from the network entity to the mobile node.

17 Claims, 11 Drawing Sheets

OTHER PUBLICATIONS

Extended Search Report for European Patent Application 06743518.0, dated Feb. 9, 2010.

Office Action on Korean Application 10-2007-7028697, dated Jan. 14, 2011 (English summary included).

Charlie Kaufman, "Internet Key Exchange (IKEv2) Protocol", [p. 1], [p. 4], [p. 7]-[p. 9], [p. 29]-[p. 30], [online], Sep. 23, 2004.

Office Action issued on Japanese Application 2008-510603, mailed Feb. 22, 2011 (English translation included).

* cited by examiner

METHOD FOR DISTRIBUTING CERTIFICATES IN A COMMUNICATION SYSTEM

BACKGROUND OF THE INVENTION

1. Field of the Invention:

The invention relates to security in mobile communication systems. Particularly, the invention relates to the delivery of root certificates to users from their home networks depending on the current network of the user.

2. Description of the Related Art:

In mobile systems security is a vital part of network and mobile terminal functionality. Due to the fact that mobile terminals may roam freely in different networks, it is necessary to establish trusted relationships between the mobile terminals and the networks, which are currently serving the mobile terminals. The trusted relationship involves that the mobile terminal and the visited network have performed mutual authentication and are prepared to use data encryption and integrity protection. As a mobile terminal roams in different network there may arise a need to establish a security association from the mobile terminal to a gateway, which provides access to a network already trusted by the mobile terminal. The network that is already trusted may be, for example, a corporate Intranet. The network that is trusted may also be an Internet segment via which it is possible to establish a trusted connection to a remote client or a remote network, which may be, for example, a corporate Intranet.

The establishing of Security Associations (SA) between a pair of hosts, between a host and a security gateway or between two security gateways is discussed in the Internet Engineering Task Force (IETF) IP security architecture (IPsec) standard, namely Request For Comments (RFC 2401). The IPsec architecture relies on the security protocols Authentication Header (AH) and Encapsulation Security Payload (ESP), which are natively present in IPv6 and also available in IPv4. The IPsec relies on two types of databases, namely a Security Policy Database (SPD) and a Security Association Database (SAD). The SPD defines the criteria based on which given packets are assigned to a given SA. The SAD describes the parameters associated with a given SA such as the algorithms and the keys used. An SA is established either manually at the request from a user or automatically as a packet is determined to be associated with an SA, which does not currently exists. The establishing of security associations is performed using Internet Key Exchange (IKE) protocol. The current version of IKE is IKE version 2, which is described, for example, in the IETF document draft-ietf-ipsec-ikev2-17.txt.

The IPsec architecture is especially useful in Wireless Local Area Networks (WLAN) where it is necessary to establish a security association between a mobile terminal and a gateway located in the current visited network of the mobile terminal. The gateway is used to access a trusted second network. The second network is, for example, a corporate Intranet or another trusted network. The security association establishment may be performed in association with the authentication of the mobile terminal to the network. The authentication of a mobile terminal to the network is described, for example, in 3$^{rd}$ Generation Partnership Project (3GPP) specification TS 33.234 V6.0.0 (2004-03). During the authentication of the mobile terminal to its home network and the authentication of the home network to the mobile terminal, it is also necessary to authenticate the gateway, which is used as an access point to the second network. Otherwise it would be possible to perform a man-in-the-middle attack by using a false gateway and to record data, which is later used in a playback type of attack.

Reference is now made to FIG. 1, which illustrates a mobile node communicating via a gateway with a remote host in a Wireless Local Area Network and Mobile Communication System interworking scenario in prior art. In FIG. 1 there is an IP network 120, to which a gateway 114 and a remote host 122 are connected. Between gateway 114 and the remote host there exists a security association 124, which carries traffic from gateway 114 to remote host 122 securely over the IP network. Mobile node 100 communicates with gateway 114 using a Wireless Local Area Network (WLAN) 110. WLAN 110 coverage area is served by at least a base station 112. With WLAN 110 is also associated an Authentication, Authorization and Accounting (AAA) proxy 116. AAA proxy communicates with gateway 114 using, for example, RADIUS (Remote Authentication Dial-In User Service) or DIAMETER (Diameter Base Protocol) protocols. RADIUS protocol is defined in the IETF document RFC 2865 and DIAMETER protocol in RFC 3588. AAA proxy 116 communicates also with an AAA server 132, which is in association with a network 130, which is the home network of mobile node 100. AAA server 132 in turn accesses a Home Location Register (HLR) 134 in order to obtain authentication and encryption information associated with mobile node 100. The authentication and encryption information are actually stored in an Authentication Center (AuC) in association with HLR 134. Hereinafter, the AuC functionality is not separately discussed, but considered as part of an HLR such as HLR 134.

Reference is now made to FIG. 2, which illustrates Extensible Authentication Protocol (EAP) authentication and key agreement signaling followed by IKEv2 security association initialization in prior art. It should be noted that the signaling is also applicable in the case of EAP Subscriber Identity Module (SIM) authentication. Extensible Authentication Protocol (EAP) is defined in IETF document RFC 2284. The purpose of the signaling is to mutually authenticate mobile node 100 and AAA server 132, which represents the home network of mobile node 100, and to mutually authenticate mobile node 100 and gateway 114. FIG. 2 also elucidates the problems involved with the checking of the certificate of gateway 114.

At time $t_1$ mobile node 100 possesses a Certification Authority (CA) certificate, in other words a root certificate, which is used to verify other certificates. The possession of CA certificate is required before other certificates may be trusted. A Certificate Authority signs all certificates that it issues with its private key. The corresponding Certificate Authority public key is itself contained within a certificate, called a CA certificate. Mobile node 100 must contain this CA certificate in its trusted root library in order to trust certificates signed by the CA's private key. The trusted root library comprises all CA certificates. The certificates for other entities are needed to verify signatures produced by peer entities communicating with the mobile node 100. Mobile node 100 may need to possess a number of CA certificates, because different entities communicating with mobile node 100 may use different certification authorities to sign their public keys. For example, different gateways in different WLANs may have certificates, which have been certified by different CAs. Therefore, before establishing communication with gateway 114 mobile node 100 must obtain the CA certificate used by gateway 114. In prior art CA certificates have been manually configured to mobile nodes. This involves that the CA certificate is delivered to mobile node on a smart card such as a Subscriber Identification Module (SIM) provided by the home network operator. The mobile node user may also manually download the CA certificates to mobile node 100. As the user subscription is activated, the home network may also decide to push a number of CA certificates to mobile node 100 before any secure communication is to be initiated by mobile node 100. The disadvantage of these solutions is that mobile node 100 needs a multitude of CA certificates, of which only a few are actually used. Besides, CA certificates essential for enabling secure communications via a visiting network may be missing from the CA certificates possessed by mobile node 100 when it is brought to the visited network. It may not be possible to obtain all CA certificates in advance to mobile node 100.

At time $t_1$ mobile node 100 starts security association initiation using IKE. A WLAN connection exists between mobile node 100 and gateway 114. In IKE initiation phase mobile node 100 sends IKE_SA_INIT message to gateway 114 as illustrated in FIG. 2 with arrow 201. The message comprises IKE header, the public Diffie-Hellman value of mobile node 100, algorithms proposed by mobile node 100 and a first nonce, which is a non-repeating random value, that is, nonsense. Gateway 114 responds by sending IKE_SA_INIT message as illustrated with arrow 202. The message comprises IKE header, the public Diffie-Hellman value of gateway 114, the algorithms selected by gateway 114 a second nonce selected by gateway 114.

In IKE authentication phase mobile node 100 sends IKE_AUTH message comprising its identity MS-Id, a value that authenticates mobile node 100 and verifies that mobile node 100 was the sender of the earlier IKE_SA_INIT message, algorithms proposed by mobile node 100 for authentication and a traffic specification, which provides information on source and destination IP addresses for the security association. The message is illustrated with arrow 203. Gateway 114 sends an EAP Response/Identity message comprising MS-Id to AAA proxy 116, which is encapsulated, for example, in a DIAMETER packet. The message is illustrated with arrow 204. AAA proxy 116 routes to the proper AAA server based on the realm part of the Network Access Identifier (NAI). The MS-Id is comprised in the NAI. The realm part identifies the home network of mobile node 100. AAA proxy 116 sends EAP Response/Identity message to AAA server 132 as illustrated with arrow 205. AAA server 132 checks if it has an unused authentication vector for mobile node 100. If there is no unused authentication vector, AAA server 132 sends mobile node 100 identity MS-Id to HLR 134 as illustrated with arrow 206. HLR 134 responds with at least one authentication vector as illustrated with arrow 207. The authentication vectors comprise at least a random value RAND, an expected response value XRES, a Ciphering Key (CK), an Integrity Key (IK), an authentication token AUTN. Thereupon, using at least the received random value RAND AAA server 132 computes a Master Session Key (MSK). In one embodiment of the invention, the MSK is computed using the received CK and IK. However, it should be noted that CK and IK have earlier been computed from the RAND value using the secret key K in an AuC in association with HLR 134.

AAA server 132 forms an EAP Request/AKA-Challenge message comprising the RAND and AUTN values, a protected pseudonym for mobile node 100 and a next re-authentication identity. The acronym AKA stands for Authentication and Key Agreement. The message is protected using a MAC value, which is generated using a secure hash algorithm with the MSK as the key. Thereupon, AAA server 132 sends the EAP Request/AKA-Challenge message to AAA proxy 116 as illustrated with arrow 208. AAA proxy sends the EAP Request/AKA-Challenge message to gateway 114.

At time $t_2$ gateway 114 includes its own certificate (GW-cert), which has been signed by a CA, and the EAP Request/AKA-Challenge message contents in IKE_AUTH message. Gateway 114 also signs the IKE_AUTH message, which is illustrated in FIG. 2 as the "sign" parameter, and sends the IKE_AUTH message to mobile node 100 as illustrated with arrow 210.

At time $t_3$ after receiving the message 210, mobile node 100 verifies that the signature "sign" in message 210 is correct by using the public key of gateway 114. The public key of gateway 114 is provided, for example, in the certificate (GW-cert) of gateway 114 that it just sent. The validity of the certificate of the gateway is checked by mobile node 100. Mobile node 100 verifies that the certificate of the gateway has been signed by CA, for example, so that mobile node 100 obtains the CA public key from the CA certificate and compares a first message digest computed from the certificate of the gateway to a second message digest obtained by decrypting the CA signature using CA public key. Thereupon, mobile node 100 forms its Master Session Key (MSK) using at least the RAND value obtained in message 210 to it. The derivation may involve first deriving an IK value and a CK value from the RAND value using the secret key K. Thus, the MSKs in mobile node 100 and AAA server 132 should be the same. Mobile node 100 computes a RES value using the secret key K shared by it and HLR 134. Mobile node 100 includes the RES value in an EAP Response/AKA-Challenge message. Mobile node 100 also computes a MAC value, which is included in the message. The message is protected using the MAC value, which is generated using a secure hash algorithm with the MSK as the key. Mobile node 100 sends the message as illustrated with arrow 211. The message is further sent by gateway 114 to AAA proxy 116 and by AAA proxy 116 to AAA server 132 as illustrated with arrows 212 and 213.

At time $t_4$ after the receiving of message 213 AAA server 132 verifies the MAC value using MSK. AAA server 132 also compares the provided RES value to the XRES value in the current authentication vector, namely the authentication vector from which corresponding RAND value was earlier sent by AAA server 132. If the comparison proves successful, AAA server 132 sends an EAP Success message to AAA proxy 116 as illustrated with arrow 214. If some extra keying material is required for WLAN technology specific confidentiality and/or integrity protection, AAA server 132 includes it into the packet carrying EAP success message. AAA server 132 includes the keying material in the underlying AAA protocol message, not in the EAP level message. AAA proxy 116 forwards the message to gateway 114, which sends the message further to mobile node 100, as illustrated with arrows 215 and 216.

SUMMARY OF THE INVENTION

The invention relates to a method for delivering certificates in a communication system comprising at least a mobile node, a gateway and a network entity. The method comprises: sending the identity of said mobile node to said network entity via said gateway; selecting in said network entity at least one first certificate based on the network to which said gateway belongs; signing in said network entity said at least one first certificate using a master key; providing said at least one first certificate from said network entity to said gateway in an Extensible Authentication Protocol (EAP) request message; sending a message comprising said at least one first certificate to said mobile node; verifying in said mobile node said message using the master key; and accepting the at least one first certificate if the verification is successful.

The invention relates also to a method for obtaining certificates in a communication system comprising at least a mobile node, a gateway and a network entity, the method comprising: sending the identity of said mobile node to said network entity via said gateway; sending authentication data from said network entity to said gateway; sending an Extensible Authentication Protocol (EAP) authentication request from said gateway to said mobile node; signing in the mobile node a certification authority identity using a master key; sending an authentication response and a signed certification authority identity from said mobile node to said network entity via said gateway; verifying in said network entity the signed certification authority identity using the master key; obtaining a first certificate with said certification authority identity in said network entity; and sending said first certificate from said network entity to said mobile node via said gateway.

The invention relates also to a method for publishing a certificate in a communication system comprising at least a mobile node, a gateway and a network entity, the method comprising: sending the identity of said mobile node to said network entity via said gateway; sending authentication data from said network entity to said gateway; sending an Extensible Authentication Protocol (EAP) authentication request to said mobile node; signing in said mobile node using a master key an enrolment request comprising at least a public key; sending an authentication response and a signed enrolment request from said mobile node to said network entity via said gateway; verifying in said network entity the signature on the enrolment request; and providing at least said public key to a secure directory by said network entity.

The invention relates also to a method for obtaining a subscriber certificate in a communication system comprising at least a mobile node, a gateway and a network entity, the method comprising: sending the identity of said mobile node to said network entity via said gateway; sending authentication data from said network entity to said gateway; sending an Extensible Authentication Protocol (EAP) authentication request from said gateway to said mobile node; signing in said mobile node using a master key an enrolment request containing at least a public key; sending an authentication response and signed enrolment request for the a public key from said mobile node to said network entity via said gateway; verifying in said network entity the signature on the enrolment request; generating a subscriber certificate for said public key in response to receiving said public key; and sending said subscriber certificate from said network entity to said mobile node via said gateway.

The invention relates also to a system comprising at least a mobile node, a gateway and a network entity, the system further comprising: a security entity in said mobile node configured to send the identity of said mobile node to said network entity via said gateway, to verify a message using a master key and to accept at least one first certificate if the verification is successful; a security entity in said gateway configured to send the message comprising said at least one first certificate to said mobile node; and a certificate delivery entity in said network entity configured to select said at least one first certificate based on the network to which said gateway belongs, to sign in said network entity said at least one first certificate using a master key, and to provide said at least one first certificate from said network entity to said gateway in an Extensible Authentication Protocol (EAP) request message.

The invention relates also to a system comprising at least a mobile node, a gateway and a network entity, the system further comprising: a security entity in said mobile node configured to send the identity of said mobile node to said network entity via said gateway, to sign a certification authority identity using a master key, to send an authentication response and said signed certification authority identity to said network entity via said gateway; a security entity in said gateway configured to send an Extensible Authentication Protocol (EAP) authentication request to said mobile node; an authentication entity in said network entity configured to send authentication data to said gateway; and a certificate delivery entity in said network entity configured to verify the signed certification authority identity using the master key and to obtain a first certificate with said certification authority identity and to send said first certificate to said mobile node via said gateway.

The invention relates also to a system comprising at least a mobile node, a gateway and a network entity, the system further comprising: a security entity in said mobile node configured to send the identity of said mobile node to said network entity via said gateway, to sign using a master key an enrolment request comprising at least a public key and to send an authentication response and said signed enrolment request to said network entity via said gateway; a security entity in said gateway configured to send an Extensible Authentication Protocol (EAP) authentication request; and a public key publication entity in said network entity configured to send authentication data to said gateway, to verify the signature on said enrolment request and to provide at least said public key to a secure directory.

The invention relates also to a system comprising at least a mobile node, a gateway and a network entity, the system further comprising: a security entity in said mobile node configured to send the identity of said mobile node to said network entity via said gateway, to sign using a master key an enrolment request comprising at least a public key and to send an authentication response and said enrolment request to said network entity via said gateway; a security entity in said gateway configured to send an Extensible Authentication Protocol (EAP) authentication request to said mobile node; an authentication entity in said network entity configured to send authentication data to said gateway and to verify the signature on said enrolment request; and a certificate delivery entity in said network entity configured to generate a subscriber certificate for said public key in response to receiving said public key, and to send said subscriber certificate from said network entity to said mobile node via said gateway.

The invention relates also to a network node comprising: an authentication entity configured to receive the identity of a mobile node from a gateway and to authenticate said mobile node; and a certificate delivery entity configured to select at least one first certificate based on the network to which said gateway belongs, to sign in said network entity said at least one first certificate using a master key, and to provide said at least one first certificate from said network entity to said mobile node.

The invention relates also to a network node comprising: an authentication entity configured to receive the identity of a mobile node from a gateway and to authenticate said mobile node; and a certificate delivery entity configured to receive a signed certification authority identity from said mobile node, to verify said signed certification authority identity using a master key, to obtain a first certificate with said certification authority identity, to sign said first certificate using said master key, and to provide said first certificate from said network entity to said mobile node via said gateway.

The invention relates also to a network node comprising: an authentication entity configured to receive the identity of a mobile node from a gateway, to authenticate said mobile node with Extensible Authentication Protocol (EAP) authentication and to verify the signature on an enrolment request; and a public key publication entity configured to receive a verified public key from said mobile node in an Extensible Authentication Protocol (EAP) response message and to publish said public key in a secure directory.

The invention relates also to a network node comprising: an authentication entity configured to receive the identity of a mobile node from a gateway, to authenticate said mobile node with Extensible Authentication Protocol (EAP) authentication and to verify the signature on an enrolment request; and a certificate delivery entity in said network entity configured to generate a subscriber certificate for said public key in response to receiving said public key, and to send said subscriber certificate from said network entity to said mobile node via said gateway.

The invention relates also to an electronic device comprising: a security entity configured to send the identity of the electronic device to a gateway, to receive at least one first certificate signed by a network entity, to derive a master session key using a secret key on a smart card in association with the electronic device and to verify the signature of the at least one first certificate using a master key.

The invention relates also to an electronic device comprising: a security entity configured to send the identity of the electronic device to a gateway, to derive a master session key using a secret key on a smart card in association with the electronic device, to send a certification authority identity signed with a master key to a gateway, to receive a first certificate signed by a network entity and to verify the signature of the first certificate using a master key.

The invention relates also to an electronic device comprising: a security entity configured to generate a public key and a private key, to send the identity of the electronic device to a gateway, to receive an Extensible Authentication Protocol (EAP) authentication request, to sign an enrolment request comprising at least said public key using a master key and to send an Extensible Authentication Protocol (EAP) authentication response comprising said enrolment request.

The invention relates also to an electronic device comprising: a security entity configured to generate a public key and a private key, to send the identity of the electronic device to a gateway, to derive a master session key using a secret key on a smart card in association with the electronic device, to sign an enrolment request comprising at least said public key using a master key, to receive an Extensible Authentication Protocol (EAP) authentication request, to send an Extensible Authentication Protocol (EAP) authentication response comprising said enrolment request, to receive a subscriber certificate for said public key, and to verify a message authentication for said subscriber certificate using said master key.

The invention relates also to a computer program comprising code adapted to perform the following steps when executed on a data-processing system: receiving the identity of a mobile node from a gateway; determining the network to which said gateway belongs;
selecting at least one first certificate based on the network to which said gateway belongs; signing said at least one first certificate using a master key associated with said mobile node; and providing said at least one first certificate to said mobile node.

The invention relates also to a computer program comprising code adapted to perform the following steps when executed on a data-processing system: receiving the identity of a mobile node from a gateway; sending an Extensible Authentication Protocol (EAP) request to said mobile node via said gateway; receiving an Extensible Authentication Protocol (EAP) response comprising a signed certification authority identity from said mobile node via said gateway; verifing the signed certification authority identity using a master key; retrieving a certification authority certificate using said certification authority identity; signing said certification authority certificate using said master key; and sending an Extensible Authentication Protocol (EAP) request comprising said certification authority certificate to said mobile node via said gateway.

The invention relates also to a computer program comprising code adapted to perform the following steps when executed on a data-processing system: receiving the identity of a mobile node via a gateway; sending an Extensible Authentication Protocol (EAP) request to said mobile node; receiving an Extensible Authentication Protocol (EAP) response and a signed enrolment request for a public key from said mobile node via said gateway; verifying the signature on the enrolment request; and providing said public key to a secure directory.

The invention relates also to a computer program comprising code adapted to perform the following steps when executed on a data-processing system: receiving the identity of a mobile node via a gateway; sending an Extensible Authentication Protocol (EAP) authentication request to said mobile node; receiving an Extensible Authentication Protocol (EAP) authentication response and a signed enrolment request for a public key from said mobile node via said gateway; verifying the signature on the enrolment request; generating a subscriber certificate for said public key; sending said subscriber certificate to said mobile node via said gateway in an Extensible Authentication Protocol (EAP) request message signed using a master key; and receiving an Extensible Authentication Protocol (EAP) response message via said gateway acknowledging said subscriber certificate.

By accepting a certificate is meant herein that the certificate is used subsequently to verify other certificates and thereby to verify signatures in messages received from any sending entity such as, for example, the gateway.

In one embodiment of the invention, a signature of the gateway and a second certificate from said gateway is added to the message to the mobile node. The second certificate is verified using one of the at least one first certificate by the security entity in the mobile node. Thereupon, the security entity verifies the signature of the gateway using the second certificate.

In one embodiment of the invention, the providing of the at least one first certificate from the network entity to the mobile node is done by sending a message comprising the at least one first certificate to the gateway, which sends them further in a message to the mobile node. The message may traverse at least one proxy between the network entity and the gateway. In one embodiment of the invention the at least one first certificate, a signature of the gateway and a second certificate associated with the gateway are sent in a single message from the gateway to the mobile node. The message is sent in response to receiving the at least one first certificate from the network entity.

The electronic device comprises a mobile node. The network node comprises a network entity, which is, for example, a network entity in the home network of the mobile node.

In one embodiment of the invention, the electronic device comprises a mobile station. In one embodiment of the invention, the electronic device comprises a wireless local area network terminal. In one embodiment of the invention, the mobile node is a fixed network node, which is moved between different fixed networks. For example, the mobile node may be a laptop computer moved from one fixed local network to another.

In one embodiment of the invention, the electronic device comprises a Subscriber Identity Module (SIM). The security entity in the mobile node may be comprised in part or completely in a SIM card.

In one embodiment of the invention a first master key is derived in the mobile node. The master key is derived in the network entity. Thereupon, the signature of the at least one first certificate is verified using the first master key in the mobile node.

In one embodiment of the invention, a challenge and expected response is provided from the network entity to the gateway. The challenge is provided from the gateway to the mobile node. A response to the challenge from the mobile node is provided to the gateway and the response is verified using the expected response. The challenge and response exchange may be, for example, according to Universal Mobile Telephone System (UMTS) Authentication and Key exchange Algorithm (AKA). The challenge is thus the AKA RAND value and the expected response is the XRES value. The challenge and response are comprised in an AKA authentication vector, which is provided from a subscriber register. The subscriber register is a Home Location Register (HLR) or a Home Subscriber Server (HSS). In one embodiment of the invention, the challenge and response are carried in Extensible Authentication Protocol (EAP) request and response messages, respectively.

In one embodiment of the invention, at least one authentication vector is obtained from a subscriber register to the network entity. The master key is computed using at least one key in an authentication vector belonging to the at least one authentication vector.

In one embodiment the first certificate is a Certification Authority (CA) certificate. The certificate may be a public key certificate. In one embodiment of the invention, the first certificate is only a certificate fingerprint computed by hashing a complete certificate.

In one embodiment of the invention, the master key, or in other words, the master session key is derived from a secret key that is possessed by both the mobile node and the network entity.

In one embodiment of the invention, the communication system comprises a wireless local area network. In one embodiment of the invention, the communication system comprises a mobile communication system. In one embodiment of the invention, the mobile communication system comprises at least one of a Global System of Mobile Communications (GSM) network and a Universal Mobile Telephone System (UMTS) network. The protocol between the network entity and the gateway communicate, for example, using the DIAMETER or the RADIUS protocol. The network entity, that is, the network node may be an Authentication, Authorization and Accounting server.

In one embodiment of the invention, the gateway is a WLAN Access Point (AP), which controls user access to at least one packet data network via the WLAN.

In one embodiment of the invention, Diffie-Hellman values are exchanged between the mobile node and the gateway and a security association is established between the mobile node and the gateway.

In one embodiment of the invention, the security entity within the mobile node is a software component. In one embodiment of the invention, the security entity within the gateway is a software component. In one embodiment of the invention, the authentication entity and the certificate delivery entities within the network entities are software components. Each of these components may comprise at least one independently compiled or translated program module. The components may comprise a number of processes or threads executed in a processor or a virtual machine such as a Java virtual machine.

In one embodiment of the invention, the computer program is stored on a computer readable medium. The computer readable medium may be a removable memory card, magnetic disk, optical disk or magnetic tape.

In one embodiment of the invention, the electronic device comprises is a mobile device, for example, a laptop computer, palmtop computer, mobile terminal or a personal digital assistant (PDA). In one embodiment of the invention, the electronic device comprises a WLAN Terminal (WT).

The benefits of the invention are related to improved reliability of the mobile node because the CA certificate required for the verification of the gateway certificate may be delivered from the home network. The CA certificates are more easily managed by the home network operator that the user of the mobile node. Further, the invention also provides the option of submitting the public key associated with the subscriber of the mobile node to a directory via the network entity in the home network. A certificate for the public key may be delivered from the home network.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 3:
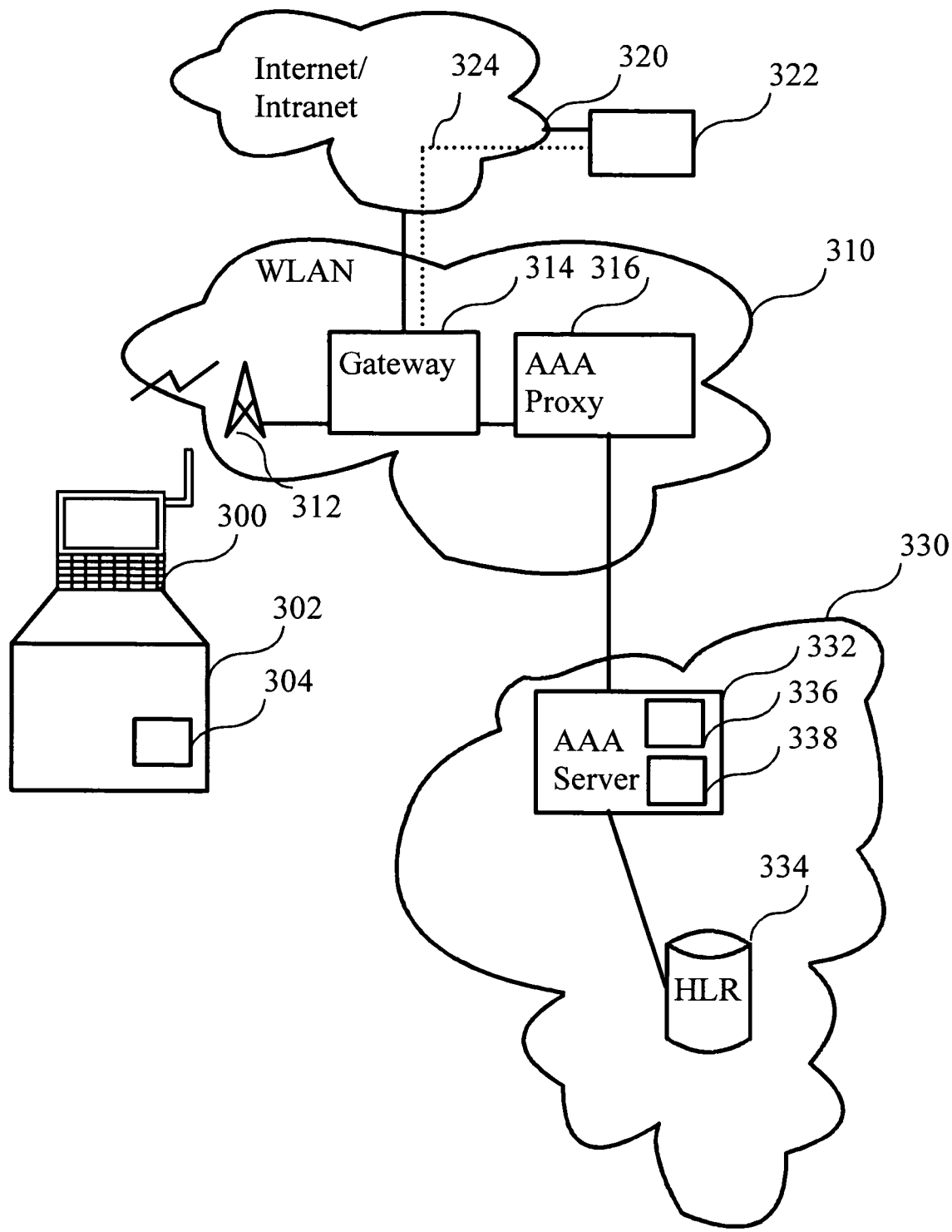
FIG. 3 is a block diagram illustrating a mobile node communicating via a gateway with a remote host in one embodiment of the invention.

FIG. 3 is a block diagram illustrating a mobile node communicating via a gateway with a remote host. FIG. 3 illustrates a mobile node communicating via a gateway with a remote host in a Wireless Local Area Network and Mobile Communication System interworking scenario. In FIG. 3 there is an IP network 320, to which a gateway 314 and a remote host 322 are connected. Between gateway 314 and the remote host there exists a security association 324, which carries traffic from gateway 314 to remote host 322 securely over IP network 320. In one embodiment of the invention, IP network 320 is trusted so that no actual security associations are needed to communicate over it with the remote host. In this case the gateway may be connected to multiple IP networks, for example, each being a different private IP network. The connection to the correct IP network is performed depending on the identity of mobile node 300.

Mobile node 300 communicates with gateway 314 using a Wireless Local Area Network (WLAN) 310. WLAN 310 coverage area is served by at least a base station 312. With WLAN 310 is also associated an Authentication, Authorization and Accounting (AAA) proxy 316. AAA proxy communicates with gateway 314 using, for example, RADIUS (Remote Authentication Dial-In User Service) or DIAMETER (Diameter Base Protocol) protocols. AAA proxy 316 communicates also with an AAA server 332, which is in association with a network 330, which is the home network of mobile node 300. AAA server 332 in turn accesses a Home Location Register (HLR) 334 in order to obtain authentication and encryption information associated with mobile node 300. The HLR may also be referred to as a Home Subscriber Server (HSS). In one embodiment of the invention, there is no AAA proxy 316 and gateway 314 and AAA server 332 communicate directly with one another.

The internal functions of mobile node 300 are illustrated in FIG. 3 with box 302. Mobile node 300 comprises a security entity 304, which receives certificates from gateways such as gateway 314 and performs the other authentication, security association establishment, management and release related tasks. Security entity 304 communicates with the network via a protocol entity (not shown), which performs, for example, at least the network layer and lower layer protocol related tasks. Tasks associated with key computation, key storage, message signing and authentication may also be performed on a smart card such as a GSM or UMTS SIM card. AAA server 332 comprises a certificate delivery entity 336, which decides based on gateway or AAA proxy addresses the correct CA certificate that must be delivered to mobile node 300. The gateway or AAA proxy addresses are obtained, for example, from an EAP Response/Identity message received in association with an IKE authentication procedure for mobile node 300. AAA server 332 comprises also an authentication entity 338, which performs the normal authentication related tasks and performs application protocol layer related tasks in communicating with AAA proxy 316 and HLR 334. The network protocol layer functionalities are performed by a network protocol layer entity (not shown). AAA server 332 may also comprise a public key publication entity (not shown), which is responsible for handling public keys received from mobile node 300. The public key publication entity provides the public key to a secure directory server from which it is accessible to other subscribers. Gateway 314 comprises a security entity (not shown), which performs the tasks related to sending the identity of the mobile node from the gateway to the network entity, to sending a message comprising a signature of the gateway to the mobile node, to the providing of the gateway certificate to the mobile node.

Figure 4:
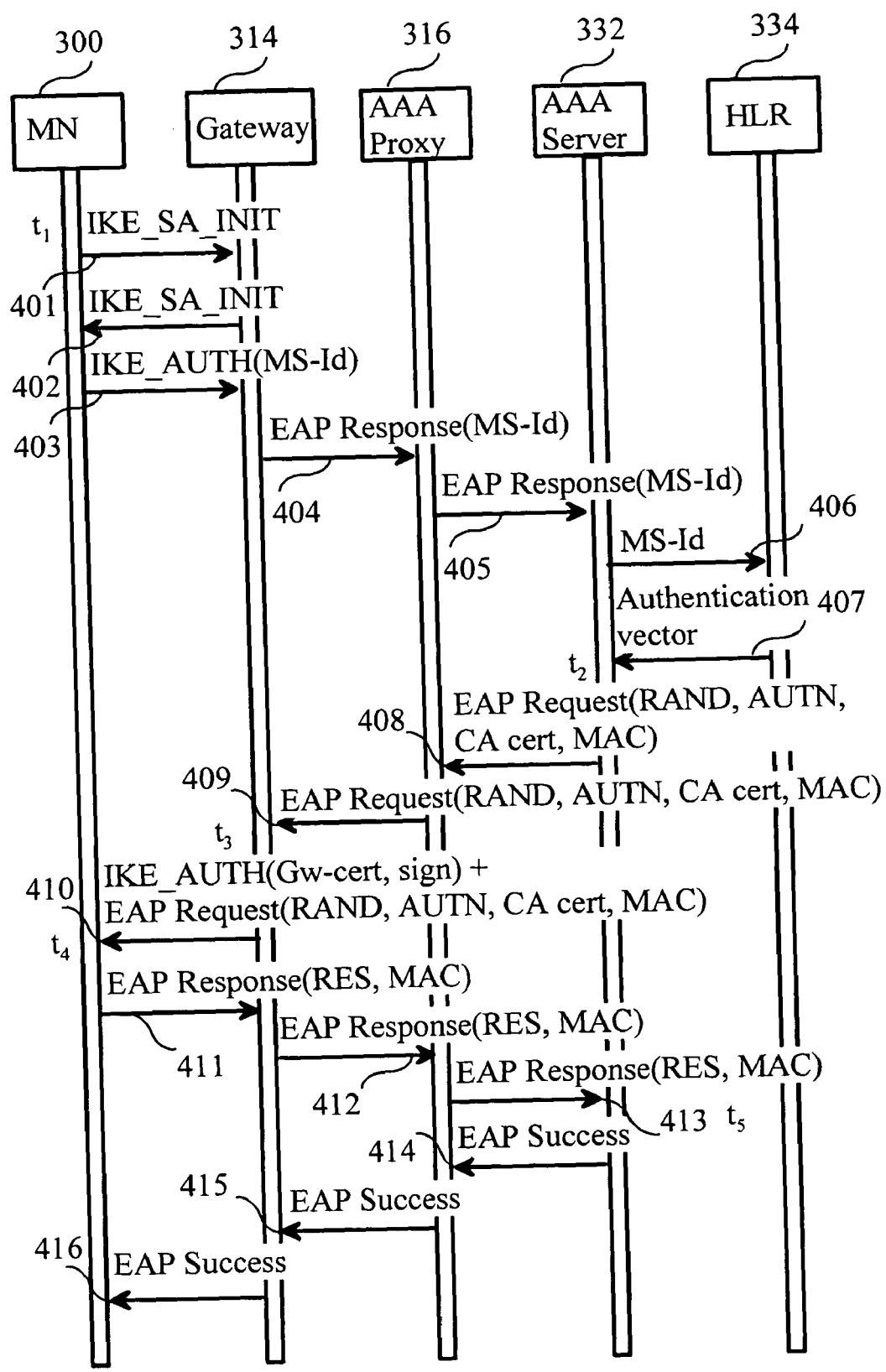
FIG. 4 is a message sequence chart illustrating the delivery of a Certification Authority (CA) certificate in an Extensible Authentication Protocol (EAP) authentication request in one embodiment of the invention.

FIG. 4 is a message sequence chart illustrating the delivery of a Certification Authority (CA) certificate in an Extensible Authentication Protocol (EAP) authentication request in one embodiment of the invention. The method is applicable as well for EAP AKA and EAP SIM authentication methods.

At time $t_1$ mobile node 300 starts security association initiation using IKE. Mobile node 300 does not necessarily possess a CA certificate for the CA that has signed the certificate of gateway 314. A WLAN connection exists between mobile node 300 and gateway 314. The security association establishment is performed using security entity 304. In IKE initiation phase security entity 304 in mobile node 300 sends IKE_SA_INIT message to gateway 314 as illustrated in FIG. 4 with arrow 401. The message comprises IKE header, the public Diffie-Hellman value of mobile node 300, algorithms proposed by security entity 304 within mobile node 300 and a first nonce, which is a non-repeating random value. Gateway 314 responds by sending IKE_SA_INIT message as illustrated with arrow 402. The message comprises IKE header, the public Diffie-Hellman value of gateway 314, the algorithms selected by gateway 314 a second nonce selected by gateway 314.

In IKE authentication phase security entity 304 sends IKE_AUTH message comprising mobile node 300 identity MS-Id, a value that authenticates mobile node 300 and verifies that mobile node 300 was the sender of the earlier IKE_SA_INIT message, algorithms proposed by mobile node 300 for authentication and a traffic specification, which provides information on source and destination IP addresses for the security association. The message is illustrated with arrow 403. Gateway 314 sends an EAP Response/Identity message comprising MS-Id to AAA proxy 316, which is encapsulated, for example, in a DIAMETER packet. The message is illustrated with arrow 404. AAA proxy 316 routes to the proper AAA server based on the realm part of the Network Access Identifier (NAI). The MS-Id is comprised in the NAI. The realm part identifies the home network of mobile node 300. AAA proxy 316 sends EAP Response/Identity message to AAA server 332 as illustrated with arrow 405. Authentication entity 338 in AAA server 332 receives the EAP Response/Identity message. Authentication entity 338 checks if it has an unused authentication vector for mobile node 300. If there is no unused authentication vector, authentication entity 338 sends mobile node 300 identity MS-Id to HLR 334 as illustrated with arrow 406. HLR 334 responds with at least one authentication vector as illustrated with arrow 407. In one embodiment of the invention, each authentication vector comprises at least a random value RAND, an expected response value XRES, a Ciphering Key (CK), an Integrity Key (IK), an authentication token AUTN.

At time $t_2$ certificate delivery entity 336 in AAA server 332 determines the network from which the EAP Response/Identity message was received. Certificate delivery entity 336 obtains the source address information from authentication entity 338. If the EAP Response/Identity message was received from AAA proxy 316, AAA server 332 considers the address of AAA proxy 316 as the source address. If the EAP Response/Identity message was received directly from a gateway such as gateway 314, certificate delivery entity 336 considers the gateway address as the source address. The source address may be an IP address or other network address or a node name, such as, for example, a Fully Qualified Domain Name (FQDN). Certificate delivery entity 336 determines the source network from the source address. The determination is performed, for example, by analyzing the source address using a tree structure, which is navigated using a number of components such as bits, digits or name components at each level. The leaf nodes in the tree structure identify the network, from which the message was received. In one embodiment of the invention, certificate delivery entity 336 requests a symbolic name, such as a FQDN, for the source network from an external server by providing it with the source address. The external server provides the symbolic name in response to certificate delivery entity. The symbolic name may further be analyzed using a tree structure to determine the actual source network part in the symbolic name. Certificate delivery entity 336 maps the source network in a table stored by AAA server 332 directly to a CA certificate or CA certificate index by means of which it retrieves the CA certificate.

Thereupon, using at least the RAND value obtained from an authentication vector, authentication entity 338 computes a Master Session Key (MSK). In one embodiment of the invention, authentication entity 338 computes the MSK using CK and IK, which in turn have been computed from the RAND value in an Authentication Center (AuC) in association with HLR 334.

Authentication entity 338 forms an EAP Request message comprising the RAND and AUTN values, a protected pseudonym for mobile node 300, a next re-authentication identity and the at least one CA certificate. The message is protected using a MAC value, which is generated using a secure hash algorithm with the MSK as the key.

In one embodiment the EAP Request message from AAA server 332 may comprise more than a single CA certificate, in which case certificate delivery entity has obtained more than a single CA certificate while mapping the source network to the CA certificates.

Thereupon, AAA server 332 sends the EAP Request message to AAA proxy 316 as illustrated with arrow 408. AAA proxy sends the EAP Request message to gateway 314.

At time $t_3$ gateway 314 includes its own certificate (GW-cert), which has been signed by a CA, and the EAP Request message contents in an IKE_AUTH message. Gateway 314 also signs the IKE_AUTH message, which is illustrated in FIG. 4 as the "sign" parameter, and sends the IKE_AUTH message to mobile node 300 as illustrated with arrow 410.

At time $t_4$ after receiving the message 410, security entity 304 in mobile node 300 also verifies that the signature "sign" in message 410 is correct by using the public key of gateway 314. The public key of gateway 314 is provided, for example, in the certificate (GW-cert) of gateway 314 in message 410. The validity of the certificate of the gateway is checked by security entity 304 using a CA certificate among the at least one CA certificate received in message 410. Security entity 304 verifies that the certificate of the gateway has been signed by the CA, for example, so that mobile node obtains the CA public key from the CA certificate and compares a first message digest computed from the certificate of the gateway to a second message digest obtained by decrypting the CA signature using CA public key. If more than a single CA certificate was provided in message 410, security entity 304 selects the CA certificate, which corresponds to the certificate of the gateway. Security entity 304 computes its Master Session Key (MSK) using at least the RAND value. In one embodiment of the invention, security entity 304 computes IK and CK values using the secret K, and thereafter from IK and CK values the MSK. Security entity 304 verifies the MAC value in message 410 using the MSK. Correct MAC value proves that the at least one CA certificate originate from AAA server 332, which has obtained correct authentication vectors from HLR 334.

Security entity 304 computes a RES value using the secret key K shared by it and HLR 334. Security entity 304 includes the RES value in an EAP Response message. The message is protected using the MAC value, which is generated using a secure hash algorithm with the MSK as the key. Security entity 304 sends the message as illustrated with arrow 411. The message is further sent by gateway 314 to AAA proxy 316 and by AAA proxy 316 to AAA server 332 as illustrated with arrows 412 and 413.

At time $t_5$ after the receiving of message 413 authentication entity 338 in AAA server 332 verifies the MAC value using MSK. Authentication entity 338 also compares the provided RES value to the XRES value in the current authentication vector, namely the authentication vector from which corresponding RAND value was earlier sent by AAA server 332. If the comparison proves successful, authentication entity 338 sends an EAP Success message to AAA proxy 316 as illustrated with arrow 414. If some extra keying material is required for WLAN technology specific confidentiality and/or integrity protection, authentication entity 338 includes it into the packet carrying EAP Success message. Authentication entity 338 includes the keying material in the underlying AAA protocol message, not in the EAP level message. AAA proxy 316 forwards the message to gateway 314, which sends the message further to mobile node 300, as illustrated with arrows 415 and 416.

Figure 5:
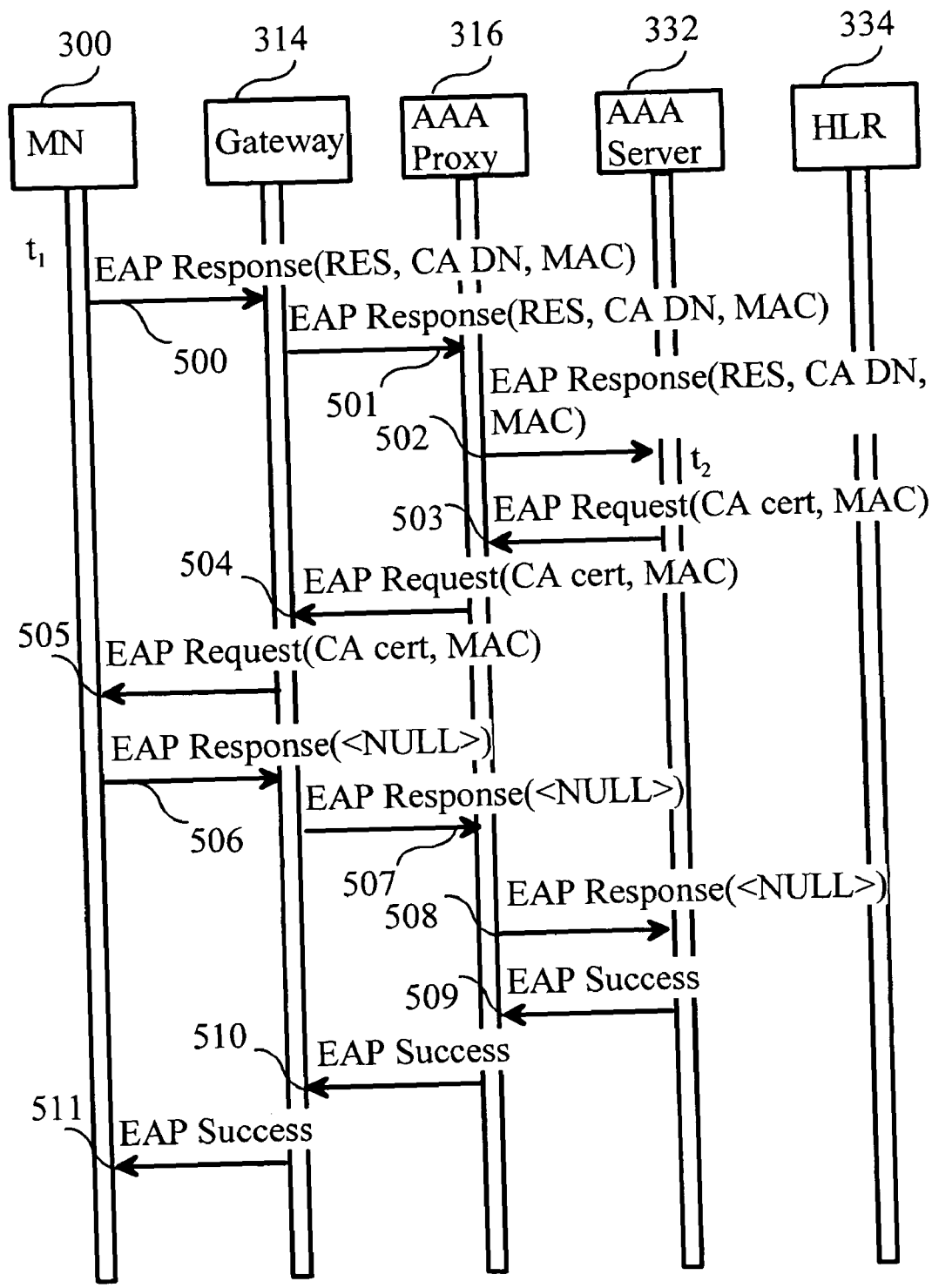
FIG. 5 is a message sequence chart illustrating the requesting and delivery of a Certification Authority (CA) certificate as part of an Extensible Authentication Protocol (EAP) authentication response message in one embodiment of the invention.

FIG. 5 is a message sequence chart illustrating the requesting of a Certification Authority (CA) certificate as part of an Extensible Authentication Protocol (EAP) authentication response message in one embodiment of the invention.

At time $t_1$ the starting point is that the IKE_SA_INIT messages have been exchanged between mobile node 300 and gateway 314. Likewise, the IKE_AUTH message comprising the identity of mobile node 300, that is, MS-Id has been sent to gateway 314. An EAP Response message comprising the identity of mobile node 300 has been sent to AAA server 332, which has responded with EAP Request to mobile node 300 via AAA proxy 316 and gateway 314. In other words, the messages corresponding to arrows from 201 to 210 in FIG. 2 have been exchanged.

After receiving the EAP Request message, security entity 304 in mobile node 300 also verifies that the signature "sign" in the EAP Request message is correct by using the public key of gateway 314. The public key of gateway 314 is provided, for example, in the certificate (GW-cert) of gateway 314 in the EAP Request message as illustrated with arrow 210 in FIG. 2. The validity of the certificate of the gateway is must be checked by security entity 304 using a CA certificate later. Security entity 304 computes a RES value using the secret key K shared by it and HLR 334. Security entity 304 includes the RES value in an EAP Response message. The message also comprises a CA Distinguished Name (DN) identifying the certification authority. A DN is the name of the entity for which a Certification Authority (CA) issues a digital certificate. The distinguished name comprises name components such as common name, organization, organizational unit, city, state and country, the combination of which guarantees the uniqueness. The message is protected using the MAC value, which is generated using a secure hash algorithm with the MSK as the key. Security entity 304 sends the message as illustrated with arrow 500. The message is further sent by gateway 314 to AAA proxy 316 and by AAA proxy 316 to AAA server 332 as illustrated with arrows 501 and 502. Authentication entity 338 in AAA server 332 verifies the MAC value using MSK. Authentication entity 338 also compares the provided RES value to the XRES value in the current authentication vector, namely the authentication vector from which corresponding RAND value was earlier sent by AAA server 332.

At time t2 AAA server 332 obtains a CA certificate based on the CA DN provided in message 502. AAA server may also contact a directory server, to which it provides the CA DN and gets in response a CA certificate. AAA server 332 packs the CA certificate in an EAP Request message, which is protected using a MAC value. AAA server 332 sends the EAP Request message to AAA proxy 316 as illustrated with arrow 503. AAA proxy 316 sends the EAP Request message to gateway 314, which sends it further to mobile node 300, as illustrated with arrows 504 and 505. The mobile node verifies the MAC using the MSK it has derived.

Thereupon, mobile node 300 sends an EAP Response message comprising a null payload to AAA server 332 via gateway 314 and AAA proxy 314 as illustrated with arrows 506, 507 and 508. The EAP Response message with a null payload indicates successful receiving of the CA certificate. AAA server 332 finishes the EAP negotiation by sending an EAP Success message to mobile node 300 via AAA proxy 316 and gateway 314 as illustrated with arrows 509, 510 and 511. After having received the CA certificate, mobile node 300 may verify the validity of the certificate of the gateway 314.

Figure 6:
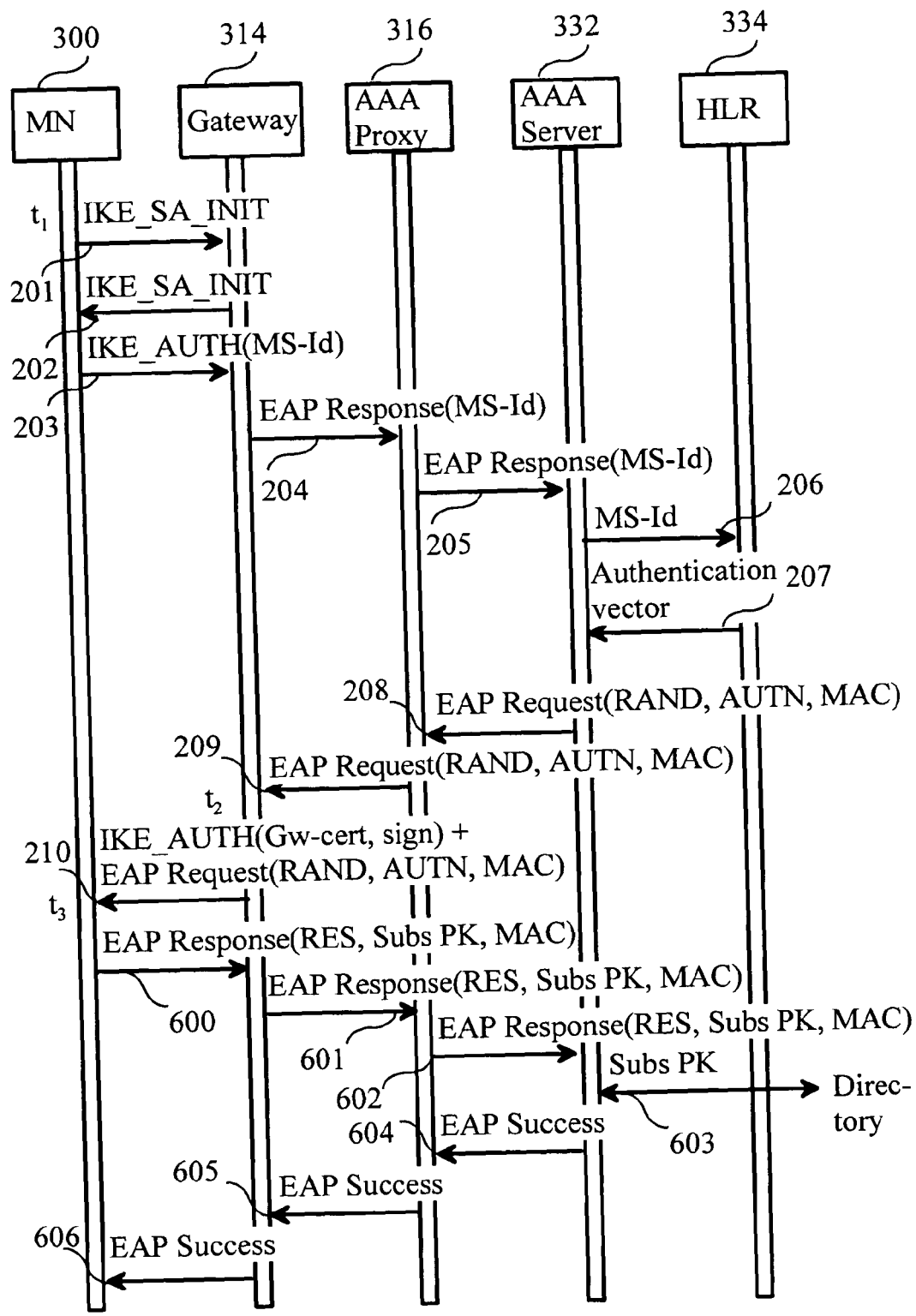
FIG. 6 is a message sequence chart illustrating the providing of a subscriber public key for a publisher in an Extensible Authentication Protocol (EAP) authentication response message and a network entity enrolling the public key in one embodiment of the invention.

FIG. 6 is a message sequence chart illustrating the providing of a subscriber public key for a publisher in an Extensible Authentication Protocol (EAP) authentication response message and a network entity enrolling the subscriber public key in one embodiment of the invention.

At time $t_1$ mobile node 300 forms a key pair consisting of a public key and a private key. The public key must be published, for example, in a directory where it is associated with a DN for the subscriber of mobile node 300. The subscriber of mobile node 300 is determined by having a subscriber identity module inserted in mobile node 300 or simply by logging on to mobile node 300 using a user-ID. In one embodiment of the invention, the public key is associated with mobile node 300 directly.

Figure 1:
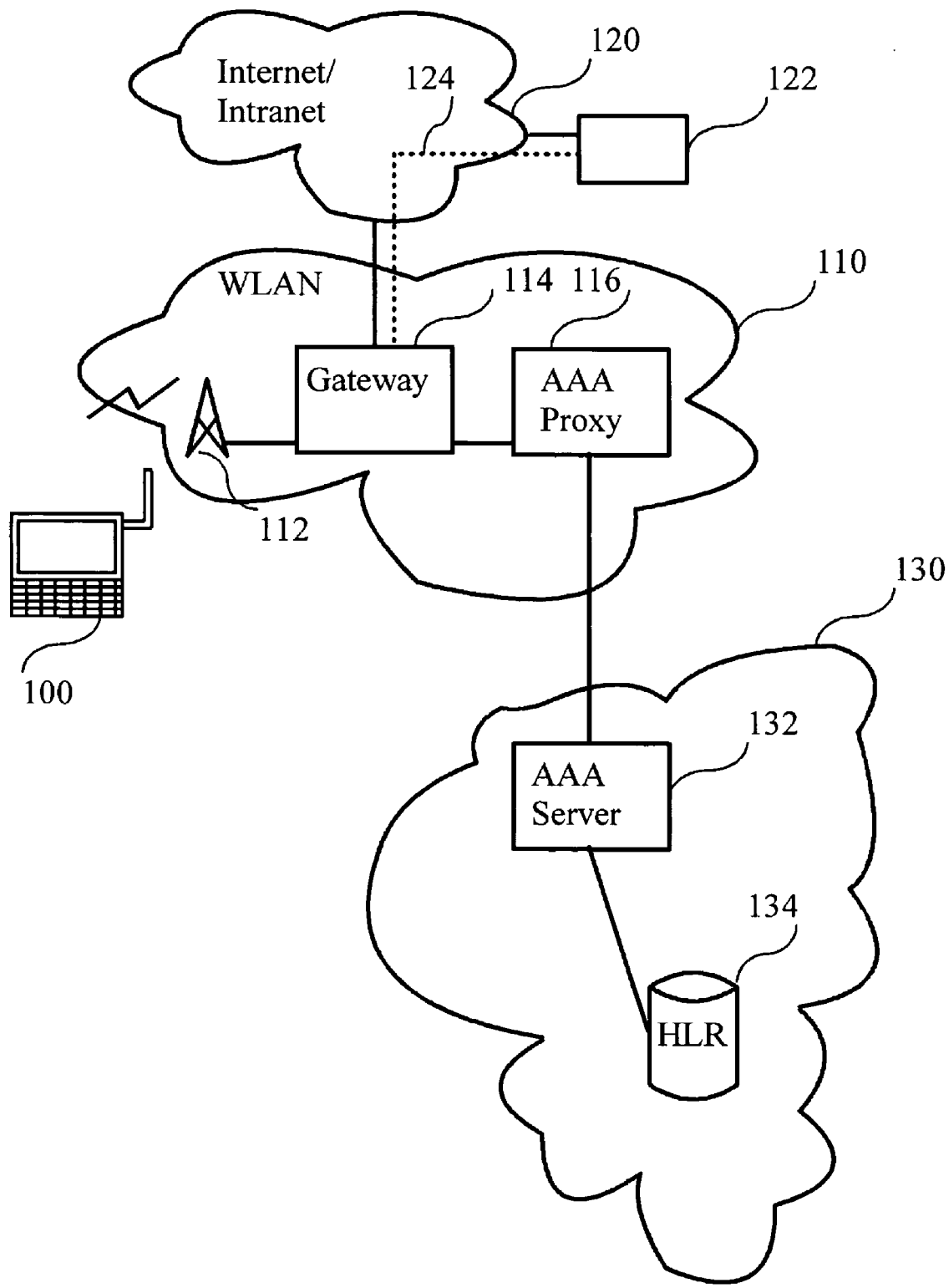
FIG. 1 is a block diagram illustrating a mobile node communicating via a gateway with a remote host in a Wireless Local Area Network and Mobile Communication System interworking scenario in prior art.
Figure 2:
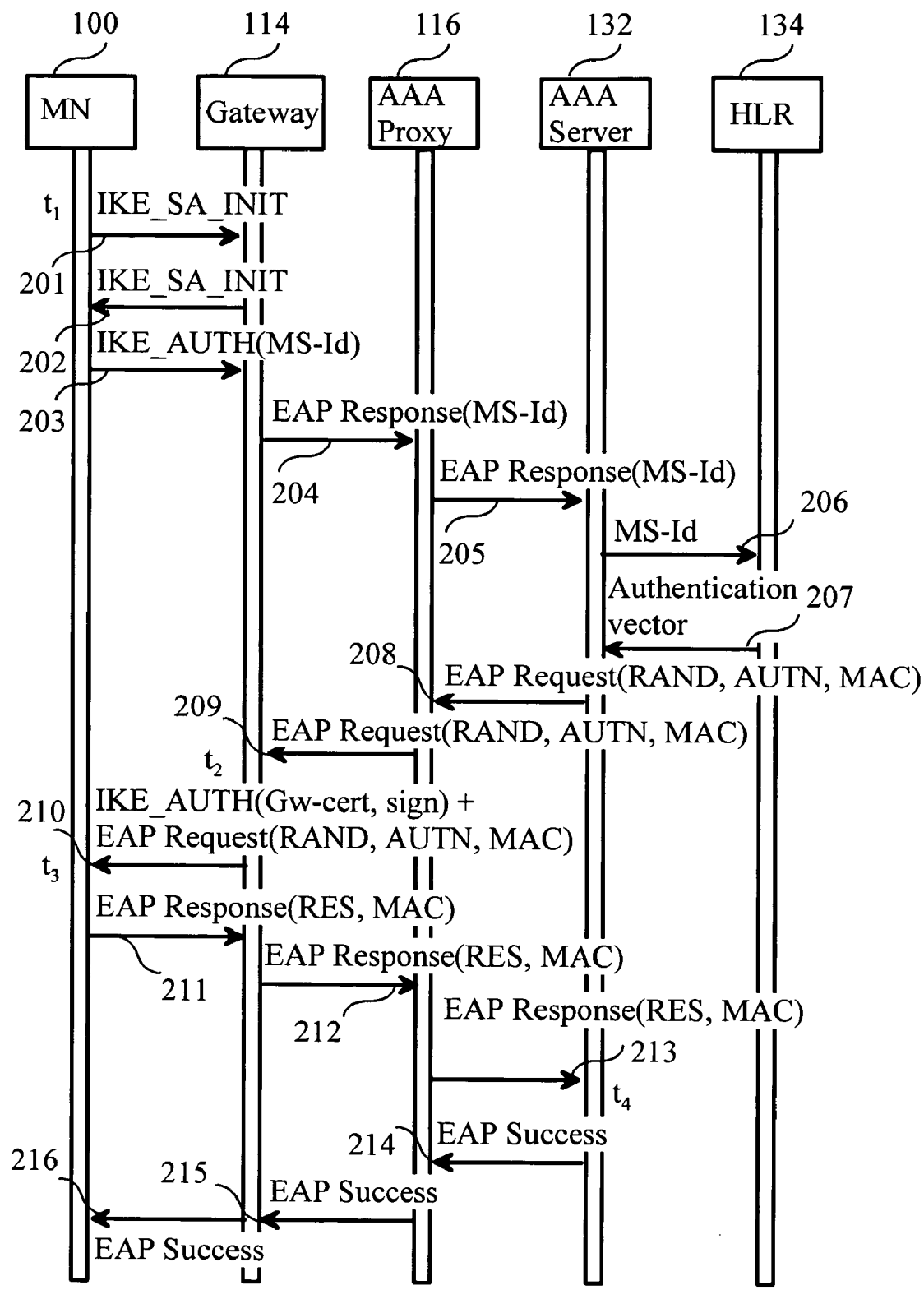
FIG. 2 is a message sequence chart illustrating Extensible Authentication Protocol (EAP) authentication and key agreement signaling followed by IKEv2 security association initialization in prior art.

In FIG. 6 the messages indicated with arrows from 201 to 210 are similar to FIG. 2. It must be noted that mobile node 300, gateway 314, AAA proxy 316, AAA server 332 and HLR 334 correspond to mobile node 100, gateway 114, AAA proxy 116, AAA server 132 and HLR 134 with respect to the handling of these messages.

After receiving the EAP Request message 210, security entity 304 in mobile node 300 also verifies that the signature "sign" in the EAP Request message is correct by using the public key of gateway 314. The public key of gateway 314 is provided, for example, in the certificate (GW-cert) of gateway 314 in the EAP Request message as illustrated with arrow 210 in FIG. 2. The validity of the certificate of the gateway is must be checked by security entity 304 using a CA certificate obtained using one of the methods described with FIGS. 4 and 5. Security entity 304 computes a RES value using the secret key K shared by it and HLR 334. Security entity 304 includes the RES value in an EAP Response message. The message also comprises the enrolment request for the public key associated with the subscriber of mobile node 300. The message is protected using the MAC value, which is generated using a secure hash algorithm with the MSK as the key. Security entity 304 sends the message as illustrated with arrow 600. The message is further sent by gateway 314 to AAA proxy 316 and by AAA proxy 316 to AAA server 332 as illustrated with arrows 601 and 602.

Thereupon, AAA server 332 provides the subscriber Public Key (PK) to a secure directory server as illustrated with arrow 603. The directory server acknowledges the deposit of the public key. AAA server 332 finishes the EAP negotiation by sending an EAP Success message to mobile node 300 via AAA proxy 316 and gateway 314 as illustrated with arrows 604, 605 and 606.

Figure 7:
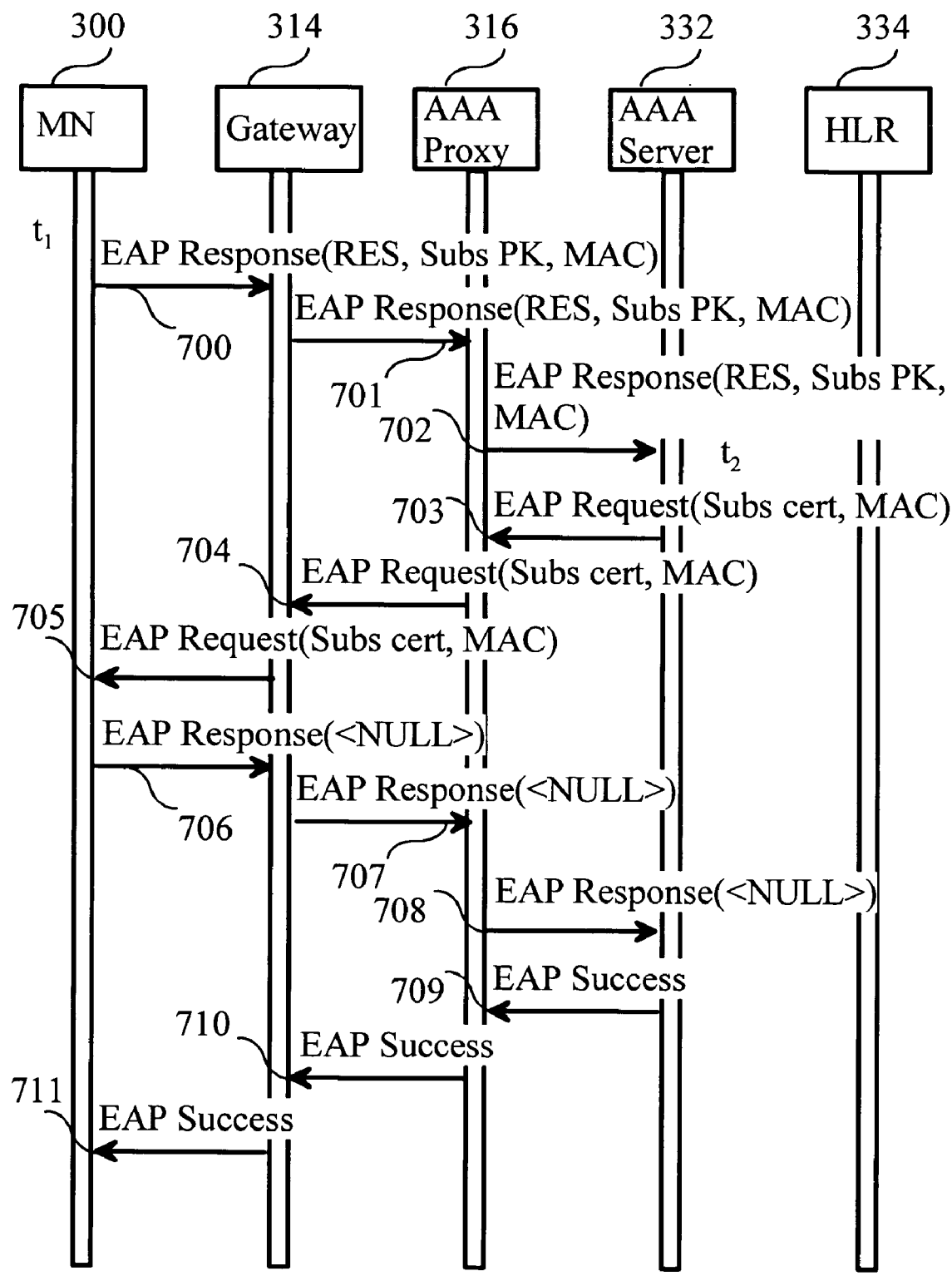
FIG. 7 is a message sequence chart illustrating the providing of a subscriber public key for a publisher as part of an Extensible Authentication Protocol (EAP) authentication response message and a network entity delivering the issued subscriber certificate in one embodiment of the invention.

FIG. 7 is a message sequence chart illustrating the providing of a subscriber public key for a publisher as part of an Extensible Authentication Protocol (EAP) authentication response message and a network entity delivering the issued subscriber certificate for subscriber public key in one embodiment of the invention.

At time $t_1$ mobile node 300 forms a key pair consisting of a public key and a private key. The public key must be published, for example, in a directory where it is associated with a DN for the subscriber of mobile node 300. The subscriber of mobile node 300 is determined by having a subscriber identity module inserted in mobile node 300 or simply by logging on to mobile node 300 using a user-ID. In one embodiment of the invention, the public key is associated with mobile node 300 directly.

Thereupon, the IKE_SA_INIT messages are exchanged between mobile node 300 and gateway 314. Likewise, the IKE_AUTH message comprising the identity of mobile node 300, that is, MS-Id is to gateway 314. An EAP Response message comprising the identity of mobile node 300 is sent to AAA server 332, which responds with EAP Request to mobile node 300 via AAA proxy 316 and gateway 314. In other words, the messages corresponding to arrows from 201 to 210 in FIG. 2 are exchanged.

After receiving the EAP Request message, security entity 304 in mobile node 300 also verifies that the signature "sign" in the EAP Request message is correct by using the public key of gateway 314. The public key of gateway 314 is provided, for example, in the certificate (GW-cert) of gateway 314 in the EAP Request message as illustrated with arrow 210 in FIG. 2. Verification of this certificate itself is done using one of the methods described with FIGS. 4 and 5. Security entity 304 computes a RES value using the secret key K shared by it and HLR 334. Security entity 304 includes the RES value in an EAP Response/AKA-Challenge message. The message also comprises the public key associated with the subscriber of mobile node 300. The message is protected using the MAC value, which is generated using a secure hash algorithm with the MSK as the key. Security entity 304 sends the message as illustrated with arrow 700. The message is further sent by gateway 314 to AAA proxy 316 and by AAA proxy 316 to AAA server 332 as illustrated with arrows 701 and 702.

At time t2 AAA server 332 provides the subscriber Public Key (PK) to a directory server as illustrated earlier in FIG. 6 with arrow 603. The directory server acknowledges the deposit of the public key. AAA server 332 also obtains a subscriber certificate, which verifies that the public key is associated with the subscriber of mobile node 300. AAA server 332 packs the subscriber certificate in an EAP Request message, which is protected using a MAC value using MSK. AAA server 332 sends the EAP Request message to AAA proxy 316 as illustrated with arrow 703. AAA proxy 316 sends the EAP Request message to gateway 314, which sends it further to mobile node 300, as illustrated with arrows 704 and 705. The mobile node 300 verifies the MAC using MSK before using the CA certificate.

Thereupon, mobile node 300 sends an EAP Response message comprising a null payload to AAA server 332 via gateway 314 and AAA proxy 314 as illustrated with arrows 706, 707 and 708. The EAP Response message with a null payload indicates successful receiving of the subscriber certificate. AAA server 332 finishes the EAP negotiation by sending an EAP Success message to mobile node 300 via AAA proxy 316 and gateway 314 as illustrated with arrows 709, 710 and 711.

Figure 8:
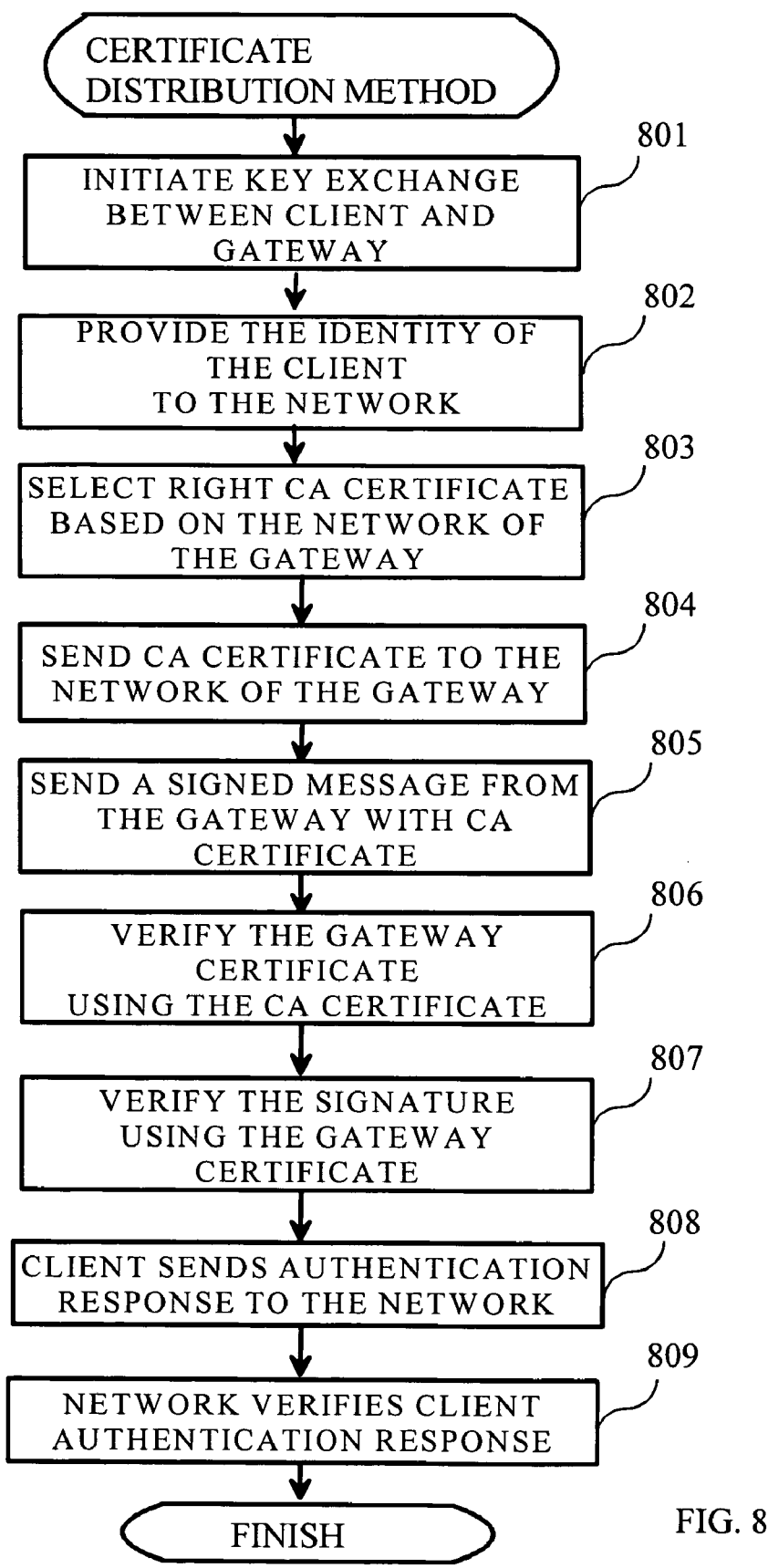
FIG. 8 is a flow chart depicting one embodiment of a method for certificate distribution in a communication system.

FIG. 8 is a flow chart depicting one embodiment of a method for certificate distribution in a communication system.

At step 801 security entity 304 in mobile node 300 gets an indication that security association must be established with gateway 314. Gateway 314 is identified to security entity 304, for example, by providing its address or its FQDN, which is resolved into an address at the request of the security entity 304. Security entity 304 initiates key exchange between the client, that is, mobile node 300 and gateway 314.

At step 802 the identity of the client is provided to the network in an identity message sent from security entity 304. The identity message is first received in gateway 314, which, after checking the identity, provides the identity message for routing towards a network entity in the home network. The identity message may traverse a number of proxy network nodes before reaching the network entity in the home network. The network entity in the home network is, for example, AAA server 332 which may communicate with an external user database such as HLR 334. In the identity message is also specified information on the network to which gateway 314 belongs. The information may be comprised in a source address field carried in the identity message. The source address may also be provided by AAA proxy 316 so that it is the one that provides information on the network to which gateway 314 belongs. The identity message is finally received in the network entity in the home network.

At step 803 the network entity in the home network selects at least one certificate based on the network in which gateway 314 belongs.

At step 804 the at least one CA certificate is provided by the network entity in the home network in a message, which is sent for routing towards the gateway 314. The message may traverse a number of proxy nodes before reaching gateway 314. The at least one CA certificate is protected by the network entity in the home network using the MSK shared by the client and the network entity in the home network. The MSK is generated, for example, using the IK and CK keys associated with the client.

At step 805 the message comprising the at least one CA certificate is received at gateway 314. Gateway 314 sends a signed message to the client. The signed message comprises the certificate of gateway 314 and the at least one CA certificate.

At step 806 the client takes the certificate of gateway 314 and the CA certificates from the signed message received from gateway 314. The client verifies the signature in the certificate of the gateway using the public key from the CA certificate corresponding to the certificate of the gateway.

At step 807 the client verifies the signature in the signed message using the public key from the certificate of the gateway. The client may trust the CA certificate, because of the MAC value included in the signed message. The MAC value has been generated by the network entity in the home network using the MSK shared by both the client and the network entity in the home network. The MAC value protects the at least one CA certificate. It should be noted that also other message fields might be protected by the MAC value.

At step 808 the client sends an authentication response message via gateway 314 to the network entity in the home network.

At step 809 the network entity in the home network verifies the authentication response provided by the client.

In one embodiment of the invention, the network entity in the home network sends a certificate fingerprint and a Uniform Resource Locator (URL), from which the whole CA certificate may be downloaded, to the client. The certificate fingerprint is formed using a hash algorithm on the CA certificate. The client would download the certificate and verify the fingerprint. Downloading the certificate may be done only once, since the client may safely cache the certificate in its memory. The benefit of this solution is that bandwidth is saved, because there is no need to download the entire certificate, which may be relatively long, for example, 600-800 bytes.

Figure 9:
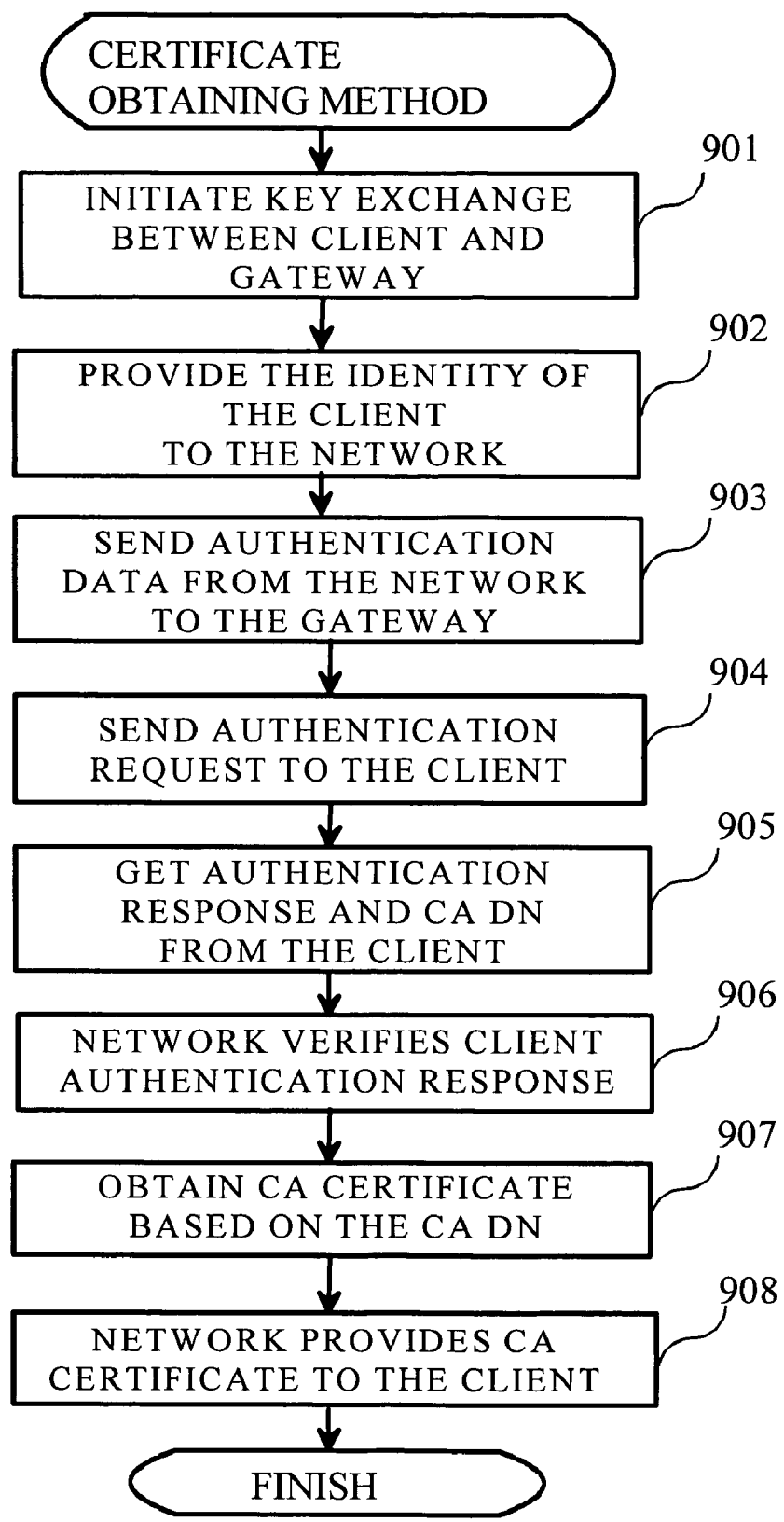
FIG. 9 is a flow chart depicting one embodiment of a method for certificate obtaining in a communication system.

FIG. 9 is a flow chart depicting one embodiment of a method for certificate obtaining in a communication system.

At step 901 security entity 304 in mobile node 300 gets an indication that security association must be established with gateway 314. Gateway 314 is identified to security entity 304, for example, by providing its address or its FQDN, which is resolved into an address at the request of the security entity 304. Security entity 304 initiates key exchange between the client, that is, mobile node 300 and gateway 314.

At step 902 the identity of the client is provided to the network in an identity message sent from security entity 304. The identity message is first received in gateway 314, which, after checking the identity, provides the identity message for routing towards a network entity in the home network. The identity message may traverse a number of proxy network nodes before reaching the network entity in the home network. The network entity in the home network is, for example, AAA server 332 which may communicate with an external user database such as HLR 334. The identity message is finally received in the network entity in the home network.

At step 903 the network entity in the home network sends authentication data to gateway 314. The authentication data may comprise values such as RAND, AUTN and MAC as explained in association with FIG. 4.

At step 904 the gateway sends an authentication request to mobile node 300 based on the authentication data received from the network entity in the home network. The authentication request is received in security entity 304 in mobile node 300.

At step 905 mobile node 300 sends an authentication response message to gateway 314, which sends it toward the network entity in the home network. With the authentication response is associated a CA DN.

At step 906 the network entity in the home network receives the authentication response. The authentication response is verified by the network entity based on the authentication data.

At step 907 the network entity in the home network obtains a CA certificate using the CA DN provided from mobile node 300. The network entity may obtain the CA certificate from a directory server using the CA DN.

At step 908 the network entity provides the CA certificate to the mobile node 300. The CA certificate is provided in a message sent in response to the authentication response message sent by mobile node 300. CA certificate is integrity protected with MAC using MSK.

Figure 10:
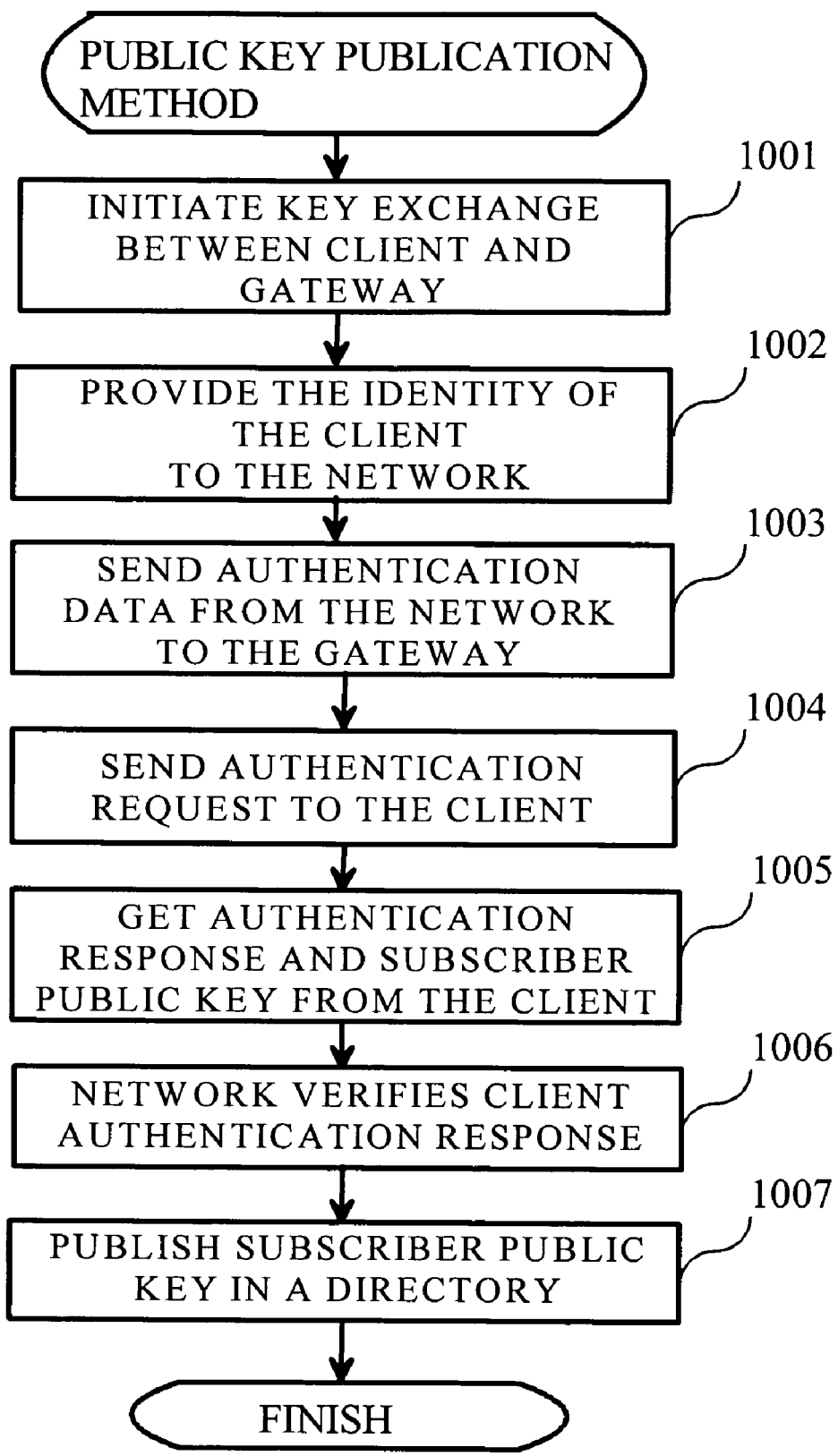
FIG. 10 is a flow chart depicting one embodiment of a method for subscriber public key publication in a communication system.

FIG. 10 is a flow chart depicting one embodiment of a method for subscriber public key publication in a communication system.

At step 1001 security entity 304 in mobile node 300 gets an indication that security association must be established with gateway 314. Gateway 314 is identified to security entity 304, for example, by providing its address or its FQDN, which is resolved into an address at the request of the security entity 304. Security entity 304 initiates key exchange between the client, that is, mobile node 300 and gateway 314.

At step 1002 the identity of the client is provided to the network in an identity message sent from security entity 304. The identity message is first received in gateway 314, which, after checking the identity, provides the identity message for routing towards a network entity in the home network. The identity message may traverse a number of proxy network nodes before reaching the network entity in the home network. The network entity in the home network is, for example, AAA server 332 which may communicate with an external user database such as HLR 334. The identity message is finally received in the network entity in the home network.

At step 1003 the network entity in the home network sends authentication data to gateway 314.

At step 1004 the gateway sends an authentication request to mobile node 300 based on the authentication data received from the network entity in the home network. The authentication request is received in security entity 304 in mobile node 300.

At step 1005 mobile node 300 sends an authentication response message to gateway 314, which sends it toward the network entity in the home network. The authentication response message also contains enrolment request for the public key associated with the subscriber of mobile node 300. The authentication response message is integrity protected with MAC using MSK.

At step 1006 the network entity in the home network receives the authentication response. The authentication response is verified by the network entity based on the authentication data and also the MAC on enrolment request is verified by the network entity using MSK.

At step 1007 the network entity in the home network provides the public key to a directory server together with an identifier that identifies the subscriber of mobile node 300. The identifier may be, for example, a distinguished name or a Session Initiation Protocol URI. Thereupon, the public key is associated with the identifier by means of which other subscribers may obtain the public key from the directory server.

Figure 11:
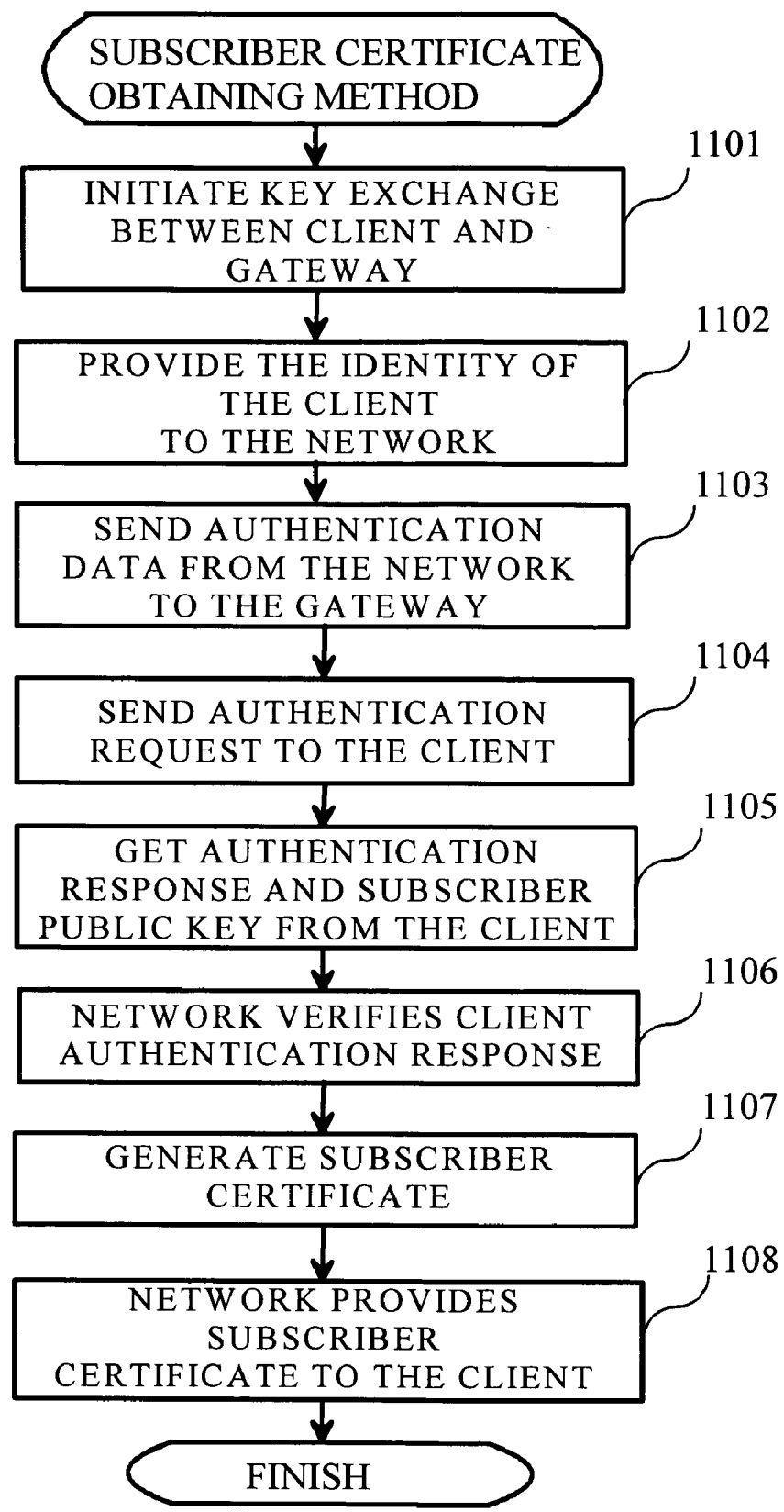
FIG. 11 is a flow chart depicting one embodiment of a method for subscriber public key publication and subscriber certificate obtaining in a communication system.

FIG. 11 is a flow chart depicting one embodiment of a method for subscriber public key publication and subscriber certificate obtaining in a communication system.

At step 1101 mobile node 300 generates a public key and private key pair associated with the subscriber of mobile node 300. Thereupon, security entity 304 in mobile node 300 gets an indication that security association must be established with gateway 314. Gateway 314 is identified to security entity 304, for example, by providing its address or its FQDN, which is resolved into an address at the request of the security entity 304. Security entity 304 initiates key exchange between the client, that is, mobile node 300 and gateway 314.

At step 1102 the identity of the client is provided to the network in an identity message sent from security entity 304. The identity message is first received in gateway 314, which, after checking the identity, provides the identity message for routing towards a network entity in the home network. The identity message may traverse a number of proxy network nodes before reaching the network entity in the home network. The network entity in the home network is, for example, AAA server 332 which may communicate with an external user database such as HLR 334. The identity message is finally received in the network entity in the home network.

At step 1103 the network entity in the home network sends authentication data to gateway 314.

At step 1104 the gateway sends an authentication request to mobile node 300 based on the authentication data received from the network entity in the home network. The authentication request is received in security entity 304 in mobile node 300.

At step 1105 mobile node 300 sends an authentication response message to gateway 314, which sends it toward the network entity in the home network. With the authentication response is associated an enrolment request for the public key for the subscriber of mobile node 300. The authentication response message is integrity protected with MAC using MSK.

At step 1106 the network entity in the home network receives the authentication response. The authentication response is verified by the network entity based on the authentication data. Also the MAC on enrolment request is verified by the network entity using MSK.

At step 1107 the network entity in the home network obtains a subscriber certificate for the public key that was sent by mobile node 300 at step 1105. The subscriber certificate is generated, for example, by the network entity or by a directory server to which the public key is provided by the network entity.

At step 1108 the network entity provides the subscriber certificate to the mobile node 300. The subscriber certificate is provided in a message sent in response to the authentication response message sent by mobile node 300.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for delivering certificates in a communication system comprising:
   receiving an identity of a mobile node at a network entity via a gateway;
   receiving a symbolic name from an external server, wherein the symbolic name is for a network to which the gateway belongs;
   selecting, in said network entity, a first certificate from a list of certificates based on the symbolic name of the network to which said gateway belongs;
   generating a message authentication code (MAC), in said network entity, based upon at least said first certificate using a first master key;
   providing said first certificate and the MAC from said network entity to said gateway in an Extensible Authentication Protocol (EAP) request message for sending to said mobile node and for verifying, in said mobile node, said EAP request message using the first master key and the MAC and to accept the first certificate when the verification is successful.

2. The method according to claim 1, wherein
   a signature of the gateway and a second certificate from said gateway are added to said EAP request message at the gateway; and wherein
   said second certificate is verified at the mobile node using the first certificate; and the signature of the gateway is verified at the mobile node using said second certificate.

3. The method according to claim 1, the method further comprising deriving said first master key in said network entity;
wherein a second master key is derived in said mobile node; and wherein the signature of said first certificate is verified using said second master key in said mobile node.

4. The method according to claim 1, the method further comprising:
receiving an EAP response from said mobile node at said network entity, wherein said EAP response comprises a response value; and
verifying said EAP response using an expected response.

5. The method according to claim 1, the method further comprising:
obtaining at least one authentication vector from a subscriber register at said network entity; and
computing said first master key using at least one key in an authentication vector belonging to said at least one authentication vector.

6. The method according to claim 1, wherein said network entity and said gateway communicate using the Diameter Base (DIAMETER) protocol or the Remote Authentication Dial-In User Service (RADIUS) protocol.

7. The method according to claim 1, wherein said mobile node and said gateway are configured to exchange Diffie-Hellman values and establish a security association between.

8. The method of claim 1, wherein said selecting comprises mapping the symbolic name of the network to which said gateway belongs to a certificate index and retrieving said first certificate from said certificate index.

9. A system comprising:
a mobile node comprising a first processor configured to execute a mobile node security entity, the mobile node security entity configured to send an identity of said mobile node to a network entity via a gateway, to verify a message using a master key and a message authentication code (MAC), and to accept a first certificate in response to successful verification;
a gateway comprising a second processor configure to execute a gateway security entity, the gateway security entity configured to send the message comprising said first certificate to said mobile node; and
a network entity comprising a third processor configure to execute:
a certificate delivery entity, the certificate delivery entity configured to request from an external server a symbolic name for a network to which said gateway belongs and to select said first certificate from a list of certificates based on the symbolic name of the network to which said gateway belongs, to generate the MAC, in said network entity, based upon at least said first certificate using a master key, and to provide said first certificate and the MAC from said network entity to said gateway in an Extensible Authentication Protocol (EAP) request message.

10. The system according to claim 9, wherein the gateway security entity is configured to add to said message a signature of the gateway and a second certificate from said gateway; and the mobile node security entity is configured to verify said second certificate using said first certificate and to verify said signature of the gateway using said second certificate.

11. The system according to claim 9, wherein the mobile node security entity is configured to derive a first master key in said mobile node and to verify the signature of said first certificate using said first master key; and a certificate delivery entity in said network entity is configured to derive said master key.

12. The system according to claim 9, wherein the third processor is further configured to execute:
an authentication entity in said network entity configured to provide a challenge and an expected response to said gateway; and wherein the mobile node security entity is configured to provide a response to said challenge to said gateway, and the gateway security entity is configured to provide said challenge to said mobile node and to verify said response using said expected response.

13. The system according to claim 9, wherein the third processor is further configured to execute:
an authentication entity configured to obtain an authentication vector from a subscriber register and to compute said master key using a key in an authentication vector belonging to said authentication vector, wherein the subscriber register is configured to provide said authentication vector.

14. The system according to claim 9, wherein the system comprises at least one of a Global System of Mobile Communications (GSM) network or a Universal Mobile Telephone System (UMTS) network.

15. The system according to claim 9, wherein said network entity and said gateway are configured to communicate using at least one of the DIAMETER protocol or the RADIUS protocol.

16. The system according to claim 9, wherein the mobile node security entity is configured to provide a first Diffie-Hellman value to said gateway and to establish a security association between said mobile node and said gateway; and the gateway security entity is configured to provide a second Diffie-Hellman value to said mobile node.

17. A non-transitory computer-readable medium having stored thereon, computer-executable instructions, which when executed by a computing device within a network, causes the computing device to perform operations comprising:
receiving an identity of a mobile node from a gateway;
receiving a symbolic name from an external server, wherein the symbolic name is for a network to which said gateway belongs;
selecting a first certificate from a list of certificates based on the symbolic name of the network to which said gateway belongs;
generating a message authentication code (MAC) based upon at least said first certificate using a master key associated with said mobile node; and
providing said first certificate and the MAC to said gateway in an Extensible Authentication Protocol (EAP) request message for sending to said mobile node, and verifying said EAP request message using the first master key and the MAC and to accept the first certificate when the verification is successful.

* * * * *